United States Patent Office 3,769,415
Patented Oct. 30, 1973

3,769,415
METHOD OF PREPARING A KILLED VACCINE
FOR ORAL USE
Paul Fenje, Toronto, Ontario, Canada, assignor to
Connaught Laboratories Limited, Willowdale, Ontario,
Canada
No Drawing. Continuation-in-part of abandoned application Ser. No. 614,760, Jan. 9, 1967. This application
June 4, 1969, Ser. No. 830,549
Int. Cl. C12k 5/00
U.S. Cl. 424—89                                    2 Claims

ABSTRACT OF THE DISCLOSURE

A process for the propagation of rabies virus and the production therefrom of a killed rabies vaccine which is substantially free from non-human, non-specific protein in which the vaccine contains protein from the group consisting of fraction V of human plasma and the material obtained from the supernatant obtained in the production of fraction V by concentration, dialysis and freeze-drying of the said supernatant, the nomenclature "fraction V" being the nomenclature used in tht Cohn cold ethanol process for fractionation of plasma.

The killed rabies vaccine may be potentiated by adjuvants to enhance immunogenic property.

In the following disclosure, the words non-specific protein refer to all proteins other than the specific protein which is related to the cell-adapted rabies virus which is used in the inoculation of the tissue culture composition of cells.

---

This application is a continuation-in-part of my application Ser. No. 614,760, filed Jan. 9, 1967, now abandoned.

SUMMARY OF INVENTION

The invention relates to a killed rabies vaccine and the method of producing it, the method having the steps of:

(a) inoculating a tissue culture composition of hamster kidney cells with a strain of hamster kidney cell-adapted rabies virus, said culture composition being substantially free from non-human protein;
(b) incubating said inoculated composition;
(c) recovering the virus-containing fluid portion of the composition; and
(d) inactivating the virus in the fluid to produce the killed rabies vaccine;

the invention herein defined consisting of the steps of adding to the tissue culture composition at step (a) a protein selected from the group consisting of fraction V of human plasma and the material obtained from the supernatant obtained in the production of "fraction V" by concentration, dialysis and freeze-drying of said supernatant, said nomenclature "fraction V" being the nomenclature used in the Cohn cold ethanol process for fractionation of plasma.

PREAMBLE TO DISCLOSURE

For many years those working in the field of rabies prophylaxis have endeavoured to develop a satisfactory tissue culture rabies vaccine suitable for human use. It was hoped that such preparations as had been proposed would induce a better immune-response than the presently available vaccines, and that they would eliminate the occurrence of post-vaccinal neuro-complications caused occasionally by rabies vaccines containing animal nervous-tissue.

It has been shown in recent years that a rabies vaccine can be produced in tissue culture which, in animal experiments, proves to be efficient in inducing both serological response and protection against challenge with street rabies virus. The difficulty has been to prepare such a vaccine free of animal serum, the presence of which renders it unsuitable for human use. The elimination of serum from the nutrient during the process of vaccine preparation results in a substantial drop in vaccine potency. Concentration of the vaccine compensated only partially for the loss.

There is increasing evidence in the last few years that viral vaccines can be significantly potentiated by addition of adjuvants. However, vaccines containing animal tissue, and particularly tissue of nervous origin, are unsuitable preparations for protentiation by adjuvants because of possible allergic reactions which may follow their use in immunization of humans. For example, the administration of vaccine containing nervous tissue of foreign origin can cause serious side effects in the patient.

It is an object of this invention to provide, by tissue culture methods, rabies vaccine which is substantially free of non-human, non-specific protein and which can be safely administered to humans. I found as a result of my early work that the production of such a vaccine could not be accomplished simply by avoiding addition of foreign protein. If one adopts this course, the potency of vaccine is low and efforts to improve the potency by concentration leave much to be desired.

It might be suggested, of course, particularly after reading some of the early literature in this field, that rabies virus could be propagated by methods comparable to those used for the growing of other viruses. Thus, for example, it is known that poliomyelitis virus grows readily in monkey kidney cells. In some circumstances human plasma or fractions thereof have been added to the monkey kidney cell composition to facilitate the growth of the cells and the propagation of the poliomyelitis virus. However, it is worthy of note that the above fact does not apply to rabies virus which, unexpectedly, does not multiply in monkey kidney cells even in the presence of plasma or fractions thereof. Thus, in spite of previous knowledge with other cells and other viruses, I was left with the problem of developing a cell culture method for the production of a rabies vaccine.

The rabies vaccine which is produced by my method is one which is suitable for use in human subjects with or without potentiation by adjuvants. These objectives I accomplish in the manner now described.

DISCLOSURE

The main object of this invention is to solve the foregoing problem and to provide a killed (inactivated) rabies vaccine suitable for human use and a method of producing the same. The rabies vaccine produced according to my method is substantially free from protein to which human subjects may show allergic response. The vaccine may be used as such or to prepare an adjuvant-containing vaccine or to prepare an adsorbed rabies vaccine such as aluminum phosphate adsorbed vaccine.

Several methods may be employed for producing the killed (inactivated) rabies vaccine. In the following description, the methods disclosed are for the purpose of illustrating the preparation of my vaccine since it will be within the skill of virologists to employ other selective techniques within the ambit of this disclosure and the appended claims.

One starts, of course, with a strain of rabies virus which may be selected from several strains commonly used or it may be one developed by selective techniques by the virologist. After selecting the rabies virus, the first step is to adapt it for growth in a tissue culture composition of hamster kidney cells.

One method I employ for producing the killed (inactivated) vaccine is as follows.

Kidneys of weanling hamsters are removed aseptically and after chopping are trypsinized in 0.25% trypsin. After washing the dispersed cells are packed by centrifugation and resuspended to contain approximately 350,000 cells per ml. These are grown in 5-litre flasks in a nutrient medium consisting of Hanks' balanced salt solution plus 0.5% lactalbumin hydrolystate plus 10% bovine serum. The medium also contains streptomycin, about 200 units per ml. The cell culture is kept at 37° C. and the medium is changed twice a week. The hydrogen ion concentration of the cell culture is maintained at about pH 7.0–7.2. When a monolayer of cells has formed the cell fluid is removed. The monolayer of cells infected by introducing 40 ml. of seed virus diluted to 1:100, the virus being a hamster kidney-cell-adapted fixed rabies virus strain. The bottles are kep at the above temperature. About 14 days after infecting the cell culture, I remove the medium, as by decantation, repetitive washing, etc., and replace with a nutrient medium free from non-human serum but containing a fraction of human blood, namely human albumin, in a concentration of about 0.1%. The cultures are then kept at 32–34° C. for about 4 to 5 days. During this time the conditions I have chosen are such that the cells remain alive and continuously release virus into the fluid which surrounds them. (It will be noted that the composition of the fluid which I have added is one which may be injected with safety and without the occurrence of unfavourable allergic response in humans, such as would be the case if I used in my vaccine the fluid which was earlier present on the cells.) The cell monolayers are then removed from the flasks by repeated freezing-thawing and then added to the respective cell fluids. The cell debris is removed by low centrifugation or filtration.

Having collected the virus fluids from which the vaccine will be produced, I now determine the titre of those fluids. I measure the titre of my virus fluid by determining its $LD_{50}$ by intercerebral inoculation of 3-week old mice injecting 0.03 ml. of various dilutions per mouse. The lowest range of a virus fluid useful for the preparation of a rabies vaccine contains approximately $1 \times 10^{5.5}$ $LD_{50}$ per ml. as described above.

Next, I use one or the other of the following steps which I refer to as steps A and B. In step A, I subject the material to high speed centrifugation at 65,000 G's for 2 hours or at 27,500 r.p.m. in a centrifuge such as Spinco type L equipped with rotor type 30. The pellets are resuspended in supernatant fluid about one-tenth of the original volume. Complete inactivation is achieved with 1/4000 formaldehyde at 37° C. for 8 hours. To neutralize free formaldehyde, I then add 1 stoichiometric unit of sodium bisulphite. Finally thimerosal is added in 1/10,000 concentration as a preservative. Next I must satisfy myself, by the commonly accepted and prescribed tests for killed rabies vaccine for human use, that the vaccine is both innocuous and potent. The harvested vaccine may be used in this adjuvant-free form as a killed rabies vaccine or it may be used as the essential component in an adjuvant vaccine. If I am preparing an adjuvant vaccine, I add for example aluminum phosphate or aluminum hydroxide. A suitable amount is about 1 mg. per ml. of the vaccine. In these circumstances the antigenicity will be enhanced about four or five-fold.

If I use step B, which is my preference, and which concerns the preparation of a vaccine concentrated by adsorption, the following steps are used. Inactivation is first accomplished by the addition of formaldehyde in a concentration of 1/4000 and the material is kept at 37° C. for 8 hours. I then add sodium bisulphite to neutralize the formaldehyde and I add thimerosal as a preservative as in step A. Now I test the material for innocuity. Having satisfied myself that the virus is killed (and otherwise acceptable, i.e. sterile, non-pyrogenic etc.), I proceed as follows: I add an adjuvant such as aluminum phosphate or aluminum hydroxide. The whole emulsion is agitated throughout about 7 days at 4° C. Then I reduce the volume to one-tenth by low speed centrifugation, discarding nine-tenths of the supernatant fluid and resuspending the precipitate in the remaining one-tenth. Now I test the product for potency by accepted means. Subject to the satisfactory completion of recognized tests (sterility, pyrogenicity, etc.) the product is filled into vials and distributed in the form of a killed, adjuvant-containing rabies vaccine for human use.

Still another variation of my invention, and a very useful variation, is one wherein I proceed as in the first example except that I omit the use of human albumin and add a preparation of polymerized glucose which has been hydrolyzed and sold under the trademark name "Dextran." (Preparations of this material are produced having various ranges of molecular size such as 50,000 to 200,000. Although any of these may be used, I have a preference for a molecular size about 150,000.) In addition to this glucose preparation I also add a fraction of human plasma which is obtained from the alcoholic supernatant remaining after the precipitation of fraction V in the cold-ethanol plasma fractionation process of Cohn and his associates. For my use this fraction is prepared by removing alcohol by vacuum distillation. The resulting aqueous concentrate is dialysed against running water for about twenty-four hours and then freeze-dried. The material so produced is hereinafter called super V. In my process I add the resulting dry powder to my culture medium to a concentration of about 100 mg. percent.

In another example of my process I use as the replacement medium free of protein other than of human origin a medium described by my colleagues Healy and Parker (J. Cell Biology, 30, 531–553, 1966) as medium "1415 DSCV" and having the composition noted by them. This medium contains among other components a quantity of polymerized glucose which has been hydrolyzed (sold under the name "Dextran") and also a quantity of the above described fraction of human plasma obtained as stated in the preceding paragraph.

The foregoing processes are given by way of illustration of the process for producing a killed rabies vaccine free or substantially free from non-specific protein other than human protein or fractions thereof. The virus is inactivated by conventional means for formaldehyde. I may use my vaccine as an adjuvanted vaccine, the use of adjuvants being known by the prior art. My examples show the use of aluminum hydroxide and aluminum phosphate but I may also use other adjuvants including oily adjuvants.

The value of my rabies vaccine, was tested by conventional laboratory methods, before use on humans, and these tests established its potency and immunizing value.

Among the recognized tests which I conduct on my finished rabies vaccine is one to show that the vaccine is a protective one, the test being the well-known Habel test: published in World Health Organization, Laboratory Techniques in Rabies, Monograph Series No. 23, 1966, page 142. A vaccine which passes this test has an acceptable potency for immunizing human subjects.

Then, to demonstrate clearly the use and value of my killed rabies vaccine (containing as an adjuvant aluminum phosphate), produced by one of the foregoing methods, in pre-immunization of humans against exposure to rabies my vaccine was administered in various schedules to 67 students in veterinary medicine. The schedules used were as follows:

Group A—23 people—3 doses at 2-week intervals
Group B—22 people—3 doses at 4-week intervals
Group C—22 people—2 doses at 8-week intervals Samples of blood were drawn prior to administration of the vaccine and thereafter at the times noted. Neutralization tests were conducted on the serum of these blood samples. The dose of vaccine used was 1 ml. at each injection. The results of serum neutralization tests are shown in the accompanying table.

TABLE.—RABIES VACCINE OF TISSUE CULTURE ORIGIN IN PRE-EXPOSURE IMMUNIZATION OF HUMANS

[Summary of Neutralization Tests]

| Immunization schedule | No. of subjects | Serum samples | Distribution of subjects according to serum neutralization titres (50% end points), serum dilutions at which antibody was detected | | | |
|---|---|---|---|---|---|---|
| | | | Undiluted | 1:5–1:25 | 1:26–1:125 | 1:126–1:625 |
| Group A, 3 doses at 1 ml. 2 week intervals | 23 | Pre-vaccination | 0 (0%) | | | |
| | | 2 weeks after 1st dose | 9 (40%) | 5 (22%) | 3 (14%) | 1 (4%) |
| | | 2 weeks after 2nd dose | 19 (83%) | 7 (30%) | 10 (43%) | 2 (9%) |
| | | 2 weeks after 3rd dose | 22 (96%) | 6 (26%) | 14 (61%) | 2 (9%) |
| Group B, 3 doses at 1 ml. 4 week intervals | 22 | Pre-vaccination | 0 (0%) | | | |
| | | 4 weeks after 1st dose | 8 (36%) | 4 (18%) | 4 (18%) | |
| | | 4 weeks after 2nd dose | 21 (96%) | 8 (36%) | 10 (45%) | 3 (14%) |
| | | 4 weeks after 3rd dose | 21 (96%) | 8 (36%) | 8 (36%) | 5 (23%) |
| Group C, 2 doses at 1 ml. 8 week intervals | 22 | Pre-vaccination | 0 (0%) | | | |
| | | 8 weeks after 1st dose | 10 (45%) | 6 (28%) | 1 (4%) | 3 (13%) |
| | | 4 weeks after 2nd dose | 21 (96%) | 12 (55%) | 7 (32%) | 2 (9%) |

It will be noted that prior to administration of the vaccine no subject showed evidence of antibodies to rabies. After only 1 dose of my vaccine each group showed a statistically significant conversion (that is, antibodies to rabies) compared with pre-vaccination titres. In each group the improvement in titre which followed a second dose of vaccine was statistically significant. In groups B and C it will be noted that only one person showed no antibodies after the second dose. In group A it will be noted that only 1 person showed no antibodies after the third dose. This experiment demonstrates clearly the value of my rabies vaccine in immunizing human subjects. No subject of the test had an allergic reaction to the vaccine.

Workers in this field may have considered the use of human sera. Although such use may avoid the use of non-human protein such as bovine serum, I am confident that some workers may raise objection to the use of human sera from the standpoint of possible transmission of infectious hepatitis. Whether or not I share this view, the fact remains that when I add fractions of human blood, such as albumin and the fraction from the preparation of albumin as noted above, rather adding human plasma or human serum, I avoid this possible difficulty arising from a virus causing infectious hepatitis or homologous serum jaundice, for the preparations which I add can be heated prior to use, if desired, by known means for protecting against the virus of hepatitis, namely by heating for 10 hours at 60° C. Thus, in my invention I have succeeded in producing a new composition of matter for the production of a killed rabies vaccine for human use.

What I claim is:
1. The method of producing a killed rabies vaccine for immunizing humans, comprising the steps of
   (a) infecting a tissue culture composition of hamster kidney cells with a strain of hamster kidney cell-adapted rabies virus,
   (b) incubating said infected composition, and thereby producing a fluid portion of said composition containing human and non-human serium unsuitable for use as a human vaccine,
   (c) removing said fluid portion from said composition and discarding said fluid portion containing human and non-human serum,
   (d) adding a nutrient medium to said composition which medium is substantially free from non-human serum and substantially free from human serum and adding to the nutrient medium a fraction of human plasma protein selected from the group consisting of fraction V and super V,
   (e) incubating the tissue-cell-culture composition,
   (f) recovering the fluid portion of said last-mentioned composition and the virus,
   (g) and inactivaitng the virus in the fluid portion to produce a killed rabies vaccine, the preceding steps being performed and arranged whereby a vaccine, suitable for human use, is obtained substantially free from non-human protein and human serum except for said one of said fraction V and super V.

2. In the method of producing rabies virus in hamster kidney cells for the preparation of a killed rabies vaccine for immunizing humans, the steps of freeing hamster kidney cells inoculated with a strain of hamster kidney cell-adapted rabies virus from substantially all human and non-human protein and then adding the inoculated cells to a nutrient medium to which is added a fraction of human plasma protein selected from the group consisting of fraction V and super V, said nutrient medium being substantially free from non-human protein and human protein except for said one of said fraction V and super V whereby a killed rabies vaccine suitable for immunizing humans is obtained.

References Cited

UNITED STATES PATENTS 3,128,228  4/1964  Michl _____ 195—1.7
3,143,470  8/1964  Wilner _____ 195—1.1

OTHER REFERENCES

Bazeley et al.: Proc. Soc. Exptl. Biol. & Med., vol. 87, pp. 420–424, 1954, 167/78 V-TC.

Fenje: Can. J. Microbiol., vol. 6, pp. 479–484, October 1960, 167/78 VK.

Fenje: Can. J. Microbiol., vol. 6, pp. 605–609, December 1960, 167/78 VK.

Healy et al.: J. Cell. Biol., vol. 30, pp. 539–553, 1966, 167/78 V-TC.

RICHARD L. HUFF, Primary Examiner

U.S. Cl. X.R.

195—1.4

UNITED STATES PATENT OFFICE
CERTIFICATE OF CORRECTION

Patent No. 3,769,415          Dated    October 30, 1973

Inventor(s) Paul FENJE

It is certified that error appears in the above-identified patent and that said Letters Patent are hereby corrected as shown below:

In the heading, amend the title to read as follows: "METHOD OF PREPARING A KILLED VACCINE." Column 2, line 16, "protentiation" should read -- potentiation --; Column 2, line 27, after "of" insert -- the --. Column 3, line 11, "lactalbumin hydrolystate" should read -- Lactalbumin Hydrolysate --; Column 3, line 20, "kep" should read -- kept --. Column 5, line 43, after "rather" insert -- than --; Column 5, line 61, "serium" should read -- serum --. Column 6, line 26, "inactivaitng" should read -- inactivating --.

Signed and sealed this 16th day of July 1974.

(SEAL)
Attest:

McCOY M. GIBSON, JR.          C. MARSHALL DANN
Attesting Officer              Commissioner of Patents